(No Model.)
N. P. STEVENS.
MACHINERY FOR MANUFACTURING BARREL HOOPS.
No. 260,334. Patented June 27, 1882.
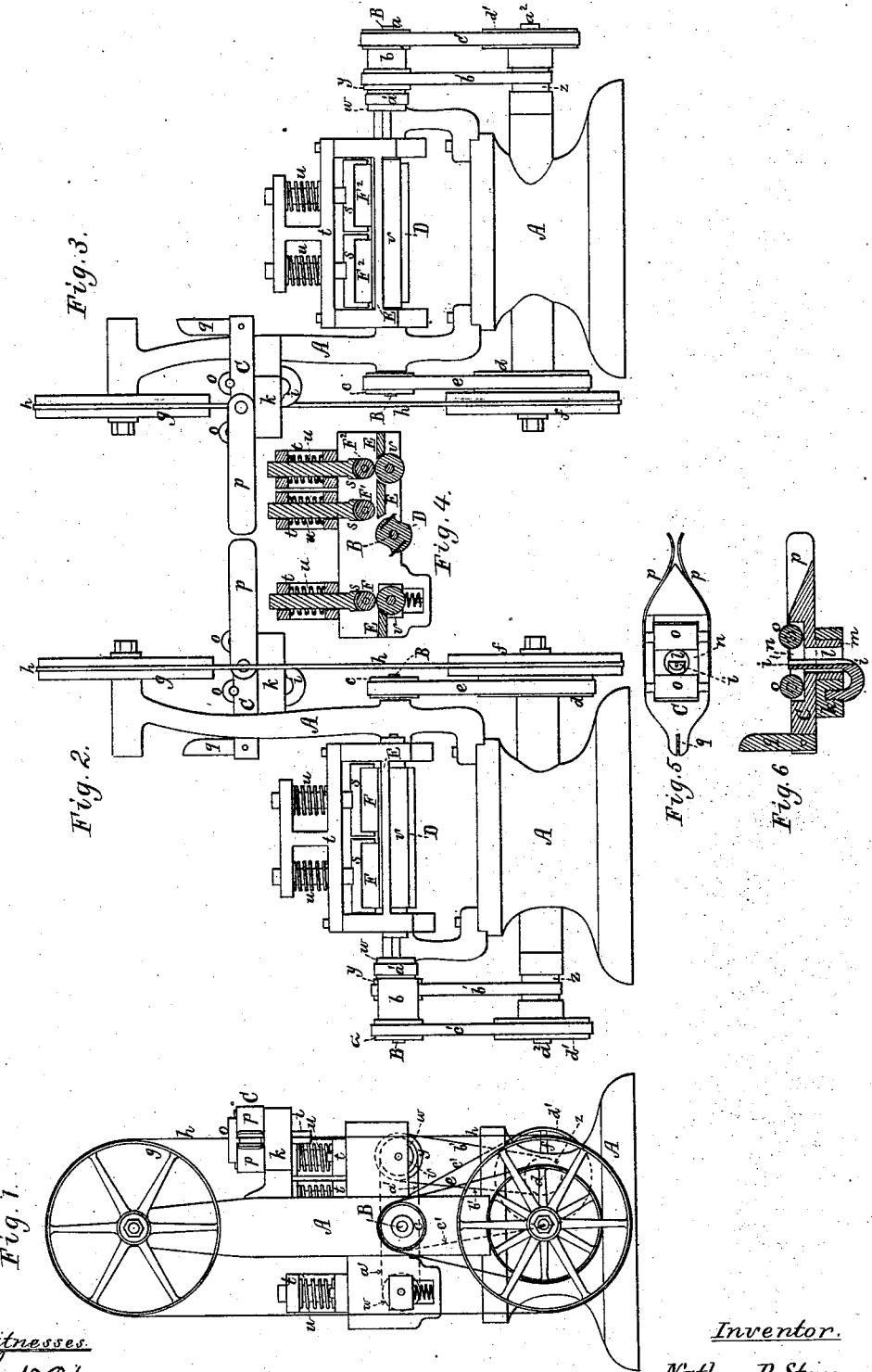
Witnesses.
J. N. Piper
E. B. Pratt
Inventor.
Nathan P. Stevens.
by R. R. Eddy atty

UNITED STATES PATENT OFFICE.

NATHAN P. STEVENS, OF CONCORD, NEW HAMPSHIRE, ASSIGNOR TO HIMSELF AND LORENZO D. BROWN, OF SAME PLACE.

MACHINERY FOR MANUFACTURING BARREL-HOOPS.

SPECIFICATION forming part of Letters Patent No. 260,334, dated June 27, 1882.

Application filed April 17, 1882. (No model.)

*To all whom it may concern:*

Be it known that I, NATHAN P. STEVENS, of Concord, in the county of Merrimack, of the State of New Hampshire, have invented a new and useful Improvement in Machinery for Manufacturing Barrel-Hoops; and I do hereby declare the same to be described in the following specification and represented in the accompanying drawings, of which—

Figure 1 is a front elevation, and Figs. 2 and 3 are side views, of a machine embodying my invention, the nature of which is defined in the claims hereinafter presented. Fig. 4 is a vertical section of the mechanism for dressing the hoop. Fig. 5 is a top view, and Fig. 6 a longitudinal section, of the mechanism for supporting and guiding the hoop-pole while being sawed and for sustaining the endless band-saw between its carrying-wheels.

In the said drawings, A is a stand for supporting the main operative parts of the machine.

Extending across and within the frame is a driving-shaft, B, provided at its opposite ends with pulleys $a$, $b$, and $c$, the pulley $b$ being the driving-pulley and to receive a belt from a suitable motor. About the pulley $c$, and another and larger pulley, $d$, fixed to the side of a wheel, $f$, is an endless band, $e$. Around the said wheel $f$ and another such wheel, $g$, arranged above it, as represented, is an endless band-saw, $h$. The wheels $f$ and $g$ are supported on journals projecting from the stand A. From the above it will be seen that when the shaft B is put in revolution the endless saw, with its supporting-wheels, will be put in movement. This saw extends down through a short projection or post, $i$, slitted vertically and supported by a bracket, $k$, extending from the stand A. The post is arranged concentrically, or about so, within the bore or sawdust-educt $l$ of a tubular journal, $m$, of the vibratory hoop-pole supporter C. This hoop-pole supporter rests upon the bracket $k$, the journal $m$ being extended down from the supporter into a bearing within the bracket. The bore of the journal is extended upward into the supporter nearly to the top of the slitted post, and opens into a rectangular cavity, $n$, in the top of the supporter, there being in such cavity, and on opposite sides of the post, two friction or guide rollers, $o$ $o$, they being arranged as represented.

Pivoted to the supporter on its opposite sides are two elastic springs or wings, $p$ $p$, and to it, at its front end, there is pivoted a thin blade or guide, $q$.

A hoop-pole to have a hoop separated from it by the saw is to be entered between the two springs $p$ $p$, or be borne against one of them, and pushed endwise against the saw. The hoop-pole, as it may be slit by the saw, is to be moved forward against the guide $q$, so as to cause the latter to enter the kerf made by the saw. The attendant, as the pole may be advanced, moves it and its supporter laterally, or vibrates the latter on its journal, as occasion may require, to cause the hoop to be cut in a proper manner or to advantage. The sawdust resulting from the action of the saw will escape through the annular space or educt about the post $i$. By having the saw to pass through the post such saw is caused thereby to maintain its normal position however the supporter C may be turned laterally with the hoop-pole. After each hoop may have been thus taken from a pole such hoop is to be dressed on its sawed face.

Fixed on the driving-shaft B is a cutter-cylinder, D, which extends up within a stationary platform, E, above which there are arranged, as shown, two sets of pressure-rollers, there being in each set three of the said rollers, (marked F, F', and F²,) each roller being sustained in and by a proper carrier, $s$, arranged in a stationary support-piece, $t$, and provided with a spring, $u$, for pressing it (the said carrier) downward. There are also within the platform E two feed-rollers, $v$ $v$, whose axles are provided with pulleys $w$ to receive an endless belt, $a'$. Fixed on one of the said axles is another pulley, $y$, about which and a pulley, $z$, on a shaft, $a^2$, is another endless belt, $b'$. A third endless belt, $c'$, going about a pulley, $d'$, on the shaft $a^2$, and another pulley, $a$, on the driving-shaft B, aids in conveying rotary motion to the shaft $a^2$. As the latter shaft may revolve, rotary motion will be imparted to the feed-rollers.

Each hoop to be dressed or planed on its sawed face is to be pressed on the bed and between its feed-rollers, and one set of pressure-rollers, and across the cutter-cylinder, which, revolving rapidly, will effect the planing or dressing of the hoop.

I make no claim to the mechanism for dressing the hoop, except in its application to the driving-shaft of the machinery for sawing the pole, such driving-shaft being made to thus answer for supporting and operating the cutter-cylinder, and at the same time to constitute part of the mechanism for driving the endless band-saw.

What I claim as my invention is as follows, viz:

1. The combination of the vibratory hoop-pole supporter C and its sustaining arm or bracket k, provided with the tubular journal m, with the stationary slitted post i, and with the endless band-saw arranged to extend into and down through such post and the supporter and its journal, as set forth.

2. The vibratory hoop-pole supporter C, provided with the springs p p and hoop-guide q, arranged with and adapted to it substantially as set forth.

3. The combination of the stand and its driving-shaft, and mechanism for operating the endless saw, with the dressing mechanism applied to the said driving-shaft and stand, and having its cutter-cylinder supported by such shaft, all being substantially as set forth.

NATHAN P. STEVENS.

Witnesses:
B. E. BADGER,
W. F. THAYER.